Sept. 26, 1961 J. KARPF 3,001,563
MEAT CHOPPERS
Filed Sept. 16, 1959 3 Sheets-Sheet 1

INVENTOR
Josef Karpf
by Irwin Salzer atty.

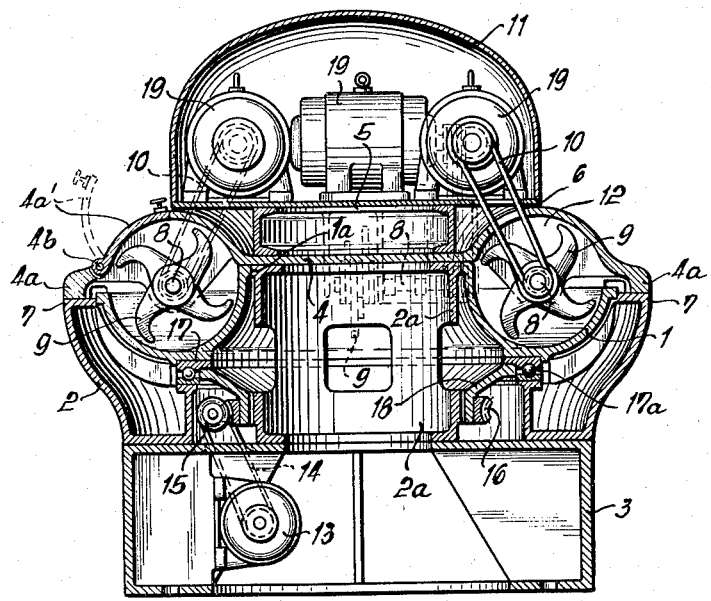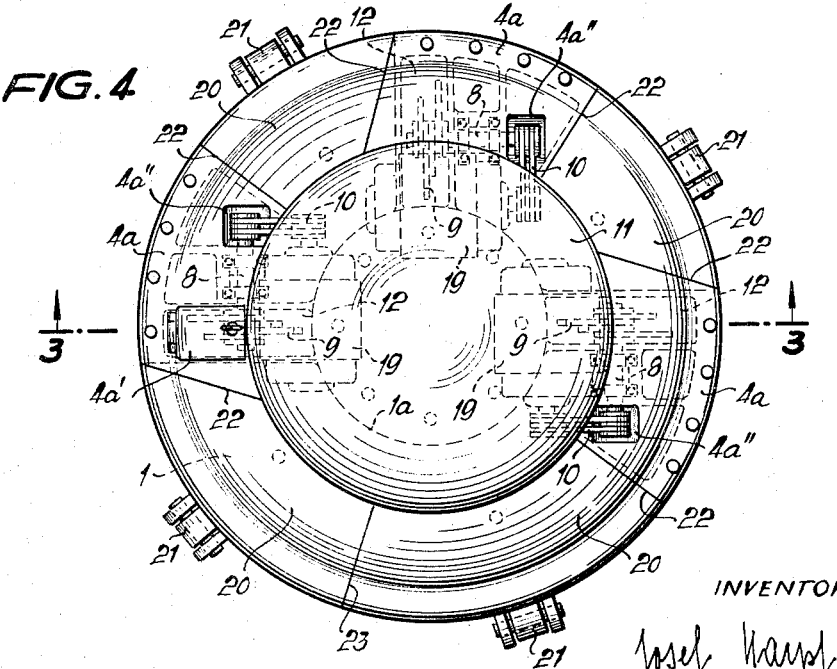

Sept. 26, 1961   J. KARPF   3,001,563
MEAT CHOPPERS

Filed Sept. 16, 1959   3 Sheets-Sheet 3

INVENTOR
Josef Karpf
by Erwin Salzer atty.

United States Patent Office 3,001,563
Patented Sept. 26, 1961

3,001,563
MEAT CHOPPERS
Josef Karpf, Salvatorstr. 18, Wurzburg, Germany
Filed Sept. 16, 1959, Ser. No. 840,320
5 Claims. (Cl. 146—67)

This invention has reference to meat cutters or meat choppers, and more particularly to meat cutters or choppers which comprise a rotatable annular meat bowl substantially semi-circular in cross-section.

This application is a continuation-in-part of my co-pending patent application Ser. No. 601,861 for Meat Mincer filed August 3, 1956, now abandoned.

It is one object of this invention to provide a machine of this character having an increased production capacity.

Another object of this invention is to provide a machine of the aforementioned character comprising a plurality of rotary meat-chopping knife structures.

Another object of this invention is to provide a machine of the aforementioned character combining large production capacity with minimum strains and stresses on the cutting or chopping knives thereof.

Another object of this invention is to provide a machine of the aforementioned character including more than two meat cutting or chopping stations along the periphery of the rotatable meat bowl.

Still another object of this invention is to provide a machine of the aforementioned character wherein each meat cutting or chopping station has a separate drive including a separate motor.

Other objects and advantages of the invention will become apparent as this specification proceeds, and the features of novelty which characterize the invention will be pointed out with particularity in the appended claim forming part of this specification.

For a better understanding of the invention reference may be had to the accompanying drawings in which:

FIG. 3 illustrates a meat chopper embodying this invention partly in side elevation but preponderantly in a section taken along 3—3 of FIG. 4;

FIG. 4 is a top-plan view of the structure shown in FIG. 3;

Figure 5:
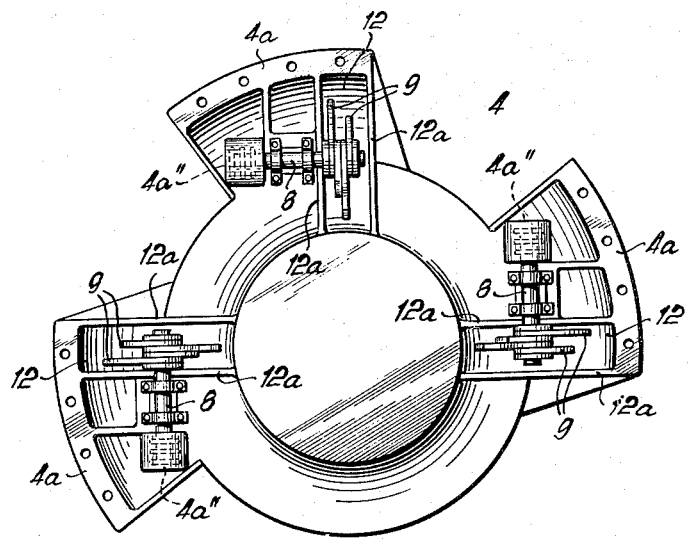
Figure 6:
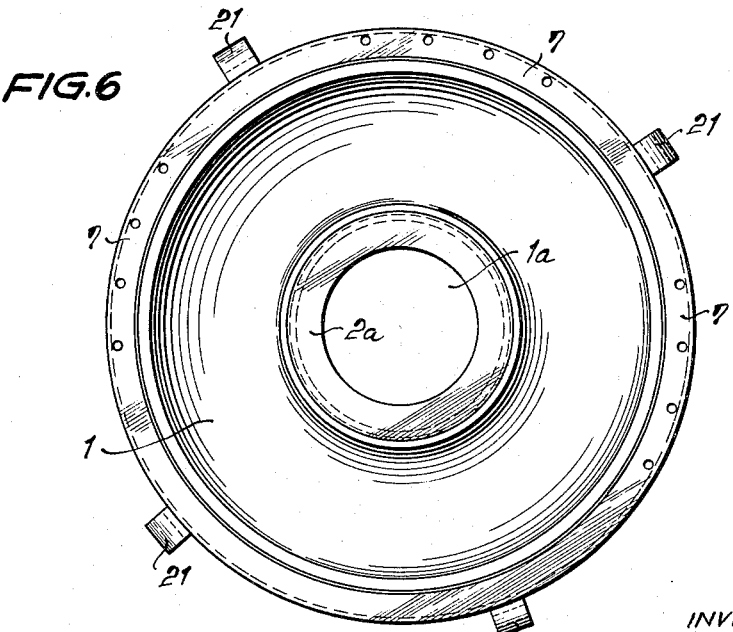

FIG. 5 is a top-plan view of part of the structure of FIGS. 3 and 4, i.e. it shows the part supporting the knife shafts and rotary knives upon having been turned around 180 degrees to expose to view the above shafts and knives normally covered by the part by which they are supported; and FIG. 6 is a top-plan view of the rotary meat bowl also shown in FIGS. 3 and 4 and its adjacent parts upon removal of all the superstructure by which it is normally covered.

Figure 1:
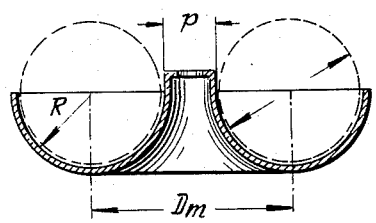
FIG. 1 is a transverse section across a prior art rotary meat bowl for meat chopping machines.

Referring now to the drawings, and more particularly to FIG. 1 thereof showing a conventional rotary meat bowl for meat choppers, meat bowls of this kind are manufactured in various sizes and the maximum capacity of such bowls is in the order of 300 liters. In order to obtain meat bowls of various sizes it is current design practice to vary both the median bowl diameter $D_m$ and the internal radius R of the cross-section of a particular bowl design without changing the proportions of the design.

In a particular family of meat choppers the ratio $r_a$ of median bowl diameter $D_m$ to internal radius R of the cross-section of the bowl was in the order of 2–3 for bowls up to a capacity of 300 liters. A proportional increase of the bowl to increase its capacity resulted in radii R in excess of 350 millimeters (or about 9″). This, in turn, resulted in such sizes of the rotary chopper knives as to unduly increase the cost and decrease the life thereof. The power of a motor required to drive a meat chopper knife increases approximately with the 4th power of the radius of the chopper knife and thus the increasing internal radius of the cross-section of the bowl resulted in the need for unduly large motors with their undesirable high starting inrush currents.

This invention contemplates an elimination of the of the above drawbacks by a radical change in the proportions of the rotatable annular meat bowl. The meat bowls for meat choppers embodying this invention have the geometry shown, or generally indicated, in FIG. 2. To be more specific, in meat bowls for meat choppers embodying this invention the ratio $r_a$ of the median bowl diameter $D_m$ to the internal radius R of the cross-section of the bowl is equal to, or larger than, 4, i.e.

$$\frac{D_m}{R}=r_a\geq 4$$

FIG. 1 illustrates a prior art type meat bowl having a capacity of 300 liters wherein $D_m=870$ millimeters, $R=300$ millimeters, $p=270$ millimeters and $$r_a=\frac{870}{300}=2.9$$

Figure 2:
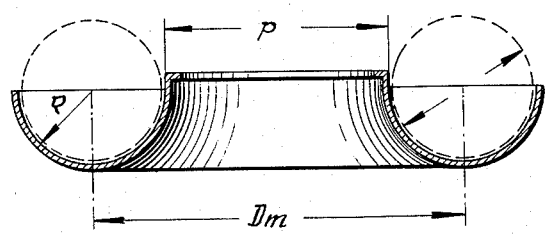
FIG. 2 is a similar transverse section of a rotary meat bowl for meat choppers embodying this invention.

FIG. 2 illustrates a meat bowl for a meat chopper embodying this invention which bowl has a capacity of 300 liters, $D_m$ being 1320 millimeters, R being 240 millimeters, $p$ being 840 millimeters and $$r_a=\frac{1320}{240}=5.5$$

A meat bowl following the above $r_a\geq 4$ rule makes it possible to reconcile large capacity thereof with relatively small radii of the cutting knives and relatively small power of the drive motors for the cutting knives. From a structural point of view such a bowl is characterized by a relatively large inner diameter $p$. Such a meat bowl may be shaped to define an axial duct in the center region thereof which is about equal to the diameter $p$, and presence of such a duct provides advantageous design possibilities, which will be considered more in detail below in connection with FIGS. 3–6. One of these design possibilities consists in arranging the motors for driving the rotary knives at points above the bowl and supporting these motors by a frame structure which extends from the region below the bowl through the aforementioned wide axial duct defined by the bowl to a region situated above the bowl.

Referring now to FIGS. 4–6 of drawings, numeral 1 has been applied to indicate a rotatable annular meat bowl substantially semi-circular in cross-section having the general geometry illustrated in FIG. 2 and described in connection therewith. In other words, bowl 1 has a predetermined median diameter and a predetermined internal radius of cross-section, and follows the above $r_a\geq 4$ rule, and thus defines a relatively wide axial duct $1a$ in the center region thereof. The frame structure of the chopper comprises the base portion 3, supporting the radially outer frame portion 2 and the radially inner frame portion $2a$. The former is shaped to follow the radially outer toroidal surface of bowl 1 and the latter projects into the duct $1a$ defined by bowl 1. The base portion 3 supports an electric motor 13 for rotating bowl 1 around the vertical axis of symmetry thereof. An endless drive means 14, such as a belt or chain, connects motor 13 with a worm drive 15, 16 comprising worm 15 and the meshing worm wheel 16. Bowl 1 rests on a part 17 forming an upper race for roller means $17a$ and secured to part 18 which is substantially in the shape of a hollow frustrated cone and supports worm wheel 16. Thus part 18 forms a drive tie between worm wheel 16 and bowl 1, transmitting to bowl 1 the torque imparted to wheel 16 by motor 13, causing rotation of bowl 1. The weight of bowl 1 and of the contents thereof is transmitted by roller means 17a to the radially outer portion 2 of the composite frame structure. The diameter of the radially outer portion 2 of the frame structure 2, 2a, 3 exceeds the radially outer diameter of bowl 1, and reference numeral 7 has been applied to indicate the region where the diameter of part 2 exceeds that of bowl 1. Numeral 4 generally indicates a superstructure arranged above of, and covering, bowl 1. Superstructure 4 comprises a radially inner portion supported by the radially inner portion 2a of the frame structure and superstructure 4 further comprises three angularly displaced arms 4a each having a radially outer end supported by the radially outer portion 7 of the composite frame structure 2, 2a, 3. It will be understood that the above dual support of superstructure 4, i.e. its radially inner support and its radially outer support imparts a high degree of stability to superstructure 4. Each arm 4a is substantially semi-circular in cross-section adjacent the radially outer end thereof (see FIG. 3) and the internal radius of said cross-section of each arm 4a is substantially equal to the internal radius of the cross-section of bowl 1. The meat chopper further comprises three relatively short shafts 8 confined to the region within the outline of superstructure 4, as can best be seen in FIG. 5. Each shaft 8 is rotatably supported by one of arms 4a on the side thereof adjacent to bowl 1 or, in other words, shafts 8 are provided on the underside of superstructure 4. Each shaft 8 supports a cutting or chopping knife structure 9 comprising a plurality of more or less hook-shaped knives arranged in stack-form. Each arm 4a forms a pair of partitions 12a on the side thereof adjacent bowl 1. Each pair of partitions 12a is arranged transversely to one of shafts 8 and sandwiches one of knife structures 9. Thus each pair of partitions 12a defines jointly with a part of arm 4a which is semi-circular in cross-section a cutting chamber 12 wherein one of knife structures 9 rotates. As mentioned above the radially inner portion 2a of the composite frame structure 2, 2a, 3 supports the radially inner portion of the superstructure 4, and the latter supports three electromotors 19 by the intermediary of spacer 5 and motor platform 6. Motors 19 are arranged at a level above superstructure 4 and transmit their power to shafts 8 and knives 9 by endless drives 10, such as belts or chains. Each arm 4a defines an aperture 4a'' for the passage of one of the endless drive means 10 from one of motors 19 to one of shafts 8. The chopper further comprises a plurality of covers 20 hingedly supported at 21 by frame structure 2 at the radially outer region 7 thereof to cover the portions of bowl 1 situated between arms 4a. Reference numeral 22 indicates the joints between adjacent arms 4a and covers 20 and numeral 23 indicates the joints between adjacent covers 20. The two wide immediately adjacent covers 22 provide a means for particularly convenient access to bowl 1. If desired, arms 4a may be provided with apertures closed by covers such as indicated on the left side of FIG. 3 showing such a cover 4a' pivotably mounted on a pin 4b.

A hood 11 may be provided to cover motors 19 resting on platform 6.

Meat choppers of the kind shown in FIGS. 3–6 may readily be designed to comprise meat bowls having a capacity in excess of 300 liters, say 500 to 1000 liters. The design principles underlying this invention are also applicable to machines having a relatively small capacity, say including a meat bowl having but a capacity of 300 liters, because it is desirable to provide a greater number of chopping stations along a relatively long periphery of which each chopping station comprises knives having a relatively small diameter or radius. Three is the preferred number of chopping stations because this number of stations makes it possible to increase capacity to average maximum requirements, and provide a large aperture in the superstructure 4 for ready access through hinged doors 20 to rotatable meat bowl 1.

With increase of the number of chopping stations along the periphery of the rotatable bowl the temperature rise and inclusion of air into the chopped meat incident to chopping are minimized.

Covers 20 separated by joint 23 serve to fill the machine with meat and to remove chopped meat therefrom, whereas covers 4a' are used for cleaning cutting chambers 12 and to replace the cutting knives after re-sharpening thereof.

It will be apparent from the foregoing that half of the trajectory of each knife 9 is situated within bowl 1 and the other half of its trajectory inside cutting chamber 12 defined by superstructure 4.

The cross-section of covers 20 is substantially semi-circular while the cross-section of covers 4a' is in the shape of a quarter circle.

It will be understood that I have illustrated and described herein a preferred embodiment of the invention and that various alterations may be made therein without departing from the spirit and scope of the invention as defined in the appended claims.

I claim as my invention:

1. A meat chopper comprising a rotatable annular meat bowl substantially semi-circular in cross-section defining a relatively wide axial duct in the center region thereof; a frame structure including a radially outer portion having a diameter exceeding the radially outer diameter of said bowl and a radially inner portion projecting into said duct; means on said frame structure rotatably supporting said bowl; a superstructure arranged above said bowl and covering said bowl, said superstructure comprising a radially inner portion supported by said radially inner portion of said frame structure and said superstructure further comprising a plurality of angularly displaced arms each having a radially outer end supported by said radially outer portion of said frame structure; a plurality of relatively short shafts confined to the region within the outline of said superstructure each rotatably supported by one of said plurality of arms on the side thereof adjacent said bowl; a plurality of rotary meat-cutting knife structures each supported by one of said plurality of shafts; a plurality of motors equal in number to the number of said arms supported by said radially inner portion of said superstructure; a plurality of endless drive means each transmitting power from one of said plurality of motors to one of said plurality of shafts, and each of said plurality of arms defining an aperture for the passage of one of said plurality of drive means from one of said plurality of motors to one of said plurality of shafts.

2. A meat chopper comprising a rotatable annular meat bowl substantially semi-circular in cross-section and having a predetermined median bowl diameter and a predetermined internal radius of cross-section, the ratio of said diameter to said radius being larger than four, and said bowl defining a relatively wide axial duct in the center region thereof; a frame structure including a radially outer portion having a diameter exceeding the radially outer diameter of said bowl and a radially inner portion projecting into said duct; means on said frame structure rotatably supporting said bowl; a superstructure arranged above said bowl and covering said bowl, said superstructure comprising a radially inner portion supported by said radially outer portion of said frame structure and said superstructure further comprising a plurality of angularly displaced arms each having a radially outer end supported by said radially inner portion of said frame structure; a plurality of relatively short shafts confined to the region within the outline of said superstructure each supported by one of said arms on the side thereof adjacent said bowl; a plurality of meat-cutting knife structures each supported by one of said plurality of shafts; a plurality of motors equal in number to the number of said arms supported by said radially inner portion of said superstructure, a plurality of endless drive means each for transmitting power from one of said plurality of motors to one of said plurality of shafts, and each of said plurality of arms defining an aperture for the passage of one of said plurality of drive means from one of said plurality of motors to one of said plurality of shafts.

3. A meat chopper comprising a rotatable annular meat bowl substantially semi-circular in cross-section defining a relatively wide axial duct in the center region thereof; a frame structure including a radially outer portion having a diameter exceeding the radially outer diameter of said bowl and a radially inner portion projecting into said duct; means on said frame structure rotatably supporting said bowl; a superstructure arranged above said bowl and covering said bowl, said superstructure comprising a radially inner portion supported by said radially inner portion of said frame structure and said superstructure further comprising three angularly displaced arms each having a radially outer end supported by said radially outer portion of said frame structure, each of said arms being substantially semi-circular in cross-section adjacent the radially outer end thereof and the internal diameter of said cross-section of each of said arms being substantially equal to the internal diameter of said semi-circular cross-section of said bowl; three relatively short shafts confined to the region within the outline of said superstructure each rotatably supported by one of said arms on the side thereof adjacent said bowl; three rotary meat-cutting knife structures each supported by one of said shafts; a pair of partitions on each of said arms on the side thereof adjacent said bowl arranged transversely to one of said shafts and sandwiching one of said knife-structures; three motors supported by said radially inner portion of said superstructure and arranged at a level above said superstructure; three endless drive means each for transmitting power from one of said motors to one of said shafts; each of said arms defining an aperture for the passage of one of said drive means from one of said motors to one of said shafts; and a plurality of covers covering the portions of said bowl situated between said arms.

4. A meat chopper comprising a rotatable annular meat bowl substantially semi-circular in cross-section and having a predetermined median bowl diameter and a predetermined internal radius of cross-section, the ratio of said diameter to said radius being larger than four, and said bowl defining a relatively wide axial duct in the center region thereof; a frame structure including a radially outer portion having a diameter exceeding the radially outer diameter of said bowl and a radially inner portion projecting into said duct; means on said frame structure rotatably supporting said bowl; a superstructure arranged above of and covering said bowl, said superstructure comprising a radially inner portion supported by said radially inner portion of said frame structure and said superstructure further comprising three angularly displaced arms each having a radially outer end supported by said radially outer portion of said frame structure, each of said arms being substantially semi-circular in cross-section adjacent the radially outer end thereof and the internal radius of said cross-section of each of said arms being substantially equal to said internal radius of said semi-circular cross-section of said bowl; three relatively short shafts confined to the region within the outline of said superstructure each rotatably supported by one of said arms on the side thereof adjacent said bowl; three rotary meat-cutting knife structures each supported by one of said shafts; a pair of partitions on each of said arms on the side thereof adjacent said bowl arranged transversely to one of said shafts and sandwiching one of said knife-structures; three motors supported by said radially inner portion of said superstructure and arranged at a level above said superstructure; three endless drive means each for transmitting power from one of said motors to one of said shafts; each of said arms defining an aperture for the passage of one of said drive means from one of said motors to one of said shafts; and a plurality of covers hinged to said frame structure and covering the portions of said bowl situated between said arms.

5. In a meat cutting machine the combination of a common base structure supporting a radially substantially bowl-shaped frame portion having an upturned radially outer supporting surface and further supporting a radially inner frame portion arranged in coaxial relation to said radially outer frame portion and having an upturned radially inner supporting surface, a substantially annular meat-receiving bowl defining a radially inner opening, said meat-receiving bowl being rotatable about the vertical axes thereof and arranged in coaxial relation to said radially outer frame portion and to said radially inner frame portion in an annular space defined by said radially outer frame portion and said radially inner frame portion, said radially inner frame portion projecting into said radially inner opening of said meat-receiving bowl; a plurality of arms extending substantially radially outwardly from the center region of said meat-receiving bowl, each of said plurality of arms being mounted at the radially inner end thereof on said radially inner frame portion, and each of said plurality of arms being mounted at the radially outer end thereof on said radially outer frame portion; each of said plurality of arms defining a slot extending in a direction substantially longitudinally thereof; a plurality of shafts each projecting transversely across said slot in one of said plurality of arms; a pulley means on each of said plurality of shafts; a cutting blade means supported by each of said plurality of shafts; a platform supported by said plurality of arms supporting a plurality of motors each driving one of said plurality of shafts, and a motor supported by said common base for driving said meat-receiving bowl.

References Cited in the file of this patent

FOREIGN PATENTS 929,834    Germany _____ July 4, 1955